US012691685B2

(12) United States Patent
Sugiura

(10) Patent No.: US 12,691,685 B2
(45) Date of Patent: Jul. 28, 2026

(54) LIQUID DISCHARGING APPARATUS

(71) Applicant: BROTHER KOGYO KABUSHIKI KAISHA, Nagoya (JP)

(72) Inventor: Keita Sugiura, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 134 days.

(21) Appl. No.: 18/588,709

(22) Filed: Feb. 27, 2024

(65) Prior Publication Data

US 2024/0326434 A1 Oct. 3, 2024

(30) Foreign Application Priority Data

Apr. 3, 2023 (JP) ................................ 2023-060039

(51) Int. Cl.
*B41J 2/155* (2006.01)
*B41J 2/045* (2006.01)

(52) U.S. Cl.
CPC ........... *B41J 2/155* (2013.01); *B41J 2/04573* (2013.01); *B41J 2/04586* (2013.01)

(58) Field of Classification Search
CPC ...... B41J 2202/20; B41J 2/155; B41J 2/1433; B41J 2/145; B41J 2/2146; B41J 2202/19; B41J 2002/14362; B41J 2/04573; B41J 2/04586
See application file for complete search history.

(56) References Cited

U.S. PATENT DOCUMENTS

2020/0101733 A1 4/2020 Hagiwara et al.
2021/0370673 A1* 12/2021 Okui ........................ B41J 2/155

FOREIGN PATENT DOCUMENTS

JP 2020049874 A 4/2020

* cited by examiner

*Primary Examiner* — Jannelle M Lebron
(74) *Attorney, Agent, or Firm* — Element IP, PLC

(57) ABSTRACT

There is provided a liquid discharging apparatus including: first and second head chips. The first and second head chips are arranged obliquely so that extending directions of nozzle rows are inclined with respect to both of a conveying direction and an orthogonal direction. A plurality of nozzles of the first head chip includes a first nozzle and a second nozzle adjacent to each other in a same nozzle row. A plurality of nozzles of the second head chip includes a third nozzle and a fourth nozzle adjacent to each other in a same nozzle row. The third nozzle is arranged between the first and second nozzles and the second nozzle is arranged between the third and fourth nozzles in the orthogonal direction, or the first and third nozzles are at a same position and the second and fourth nozzles are at a same position in the orthogonal direction.

4 Claims, 8 Drawing Sheets

(SECOND ASPECT)

(FOURTH ASPECT)

LIQUID DISCHARGING APPARATUS

REFERENCE TO RELATED APPLICATIONS

This application claims priority from Japanese Patent Application No. 2023-060039 filed on Apr. 3, 2023. The entire content of the priority application is incorporated herein by reference.

BACKGROUND ART

As a printer of an ink-jet system, a printer of a line system is known. A printer of the line system is provided with a head module which is long in a direction orthogonal to a conveying direction of a recording medium. Further, a printer of the line system discharges an ink, from nozzles of the head module which is fixed, toward the recording medium which is being conveyed so as to form an image on the recording medium. Further, a head module of a printer of the line system has a plurality of heads each of which is short-sized and which is provided in a staggered manner so as to arrange the nozzles at equal spacing distances therebetween in the entirety in the longitudinal direction of the head module.

SUMMARY

In a case of a head module having a configuration as described in Japanese Patent Application Laid-open No. 2020-049874, it is necessary to arrange a plurality of heads also in the conveying direction in an attempt of realizing a high resolution of a printed image and/or an improved throughput. Namely, in such a case, a plurality of head modules, each of which having the heads provided in the staggered manner thereon, is to be arranged side by side in the conveying direction. This leads to increase in the size of the printer and to increase in a separating distance between two nozzles corresponding, respectively, to two dots which are adjacent on the printed image, which in turn leads to such a possibility that the quality of the printed image might be lowered due to deviation in landing position(s) of the dot(s) caused by an error in the conveyance. A problem of a kind same as the problem descried above occurs also in a printer of which system is different from the line system, for example, in a printer of a serial head system.

In view of the above-described situation, an object of the present disclosure is to provide a liquid discharging apparatus capable of realizing a high resolution and an improved throughput while suppressing increase in a size of a printer and suppressing lowering in an image quality.

According to an aspect of the present disclosure, there is provided a liquid discharging apparatus including:

a first head chip having a nozzle surface in which a nozzle row is formed, a plurality of nozzles configured to discharge a liquid toward a recording medium being arranged in the nozzle row; and a second head chip having a nozzle surface in which a nozzle row is formed, a plurality of nozzles configured to discharge a liquid toward the recording medium being arranged in the nozzle row, wherein:

the first head chip is arranged obliquely so that an extending direction of the nozzle row is inclined with respect to both of a conveying direction of the recording medium and an orthogonal direction orthogonal to the conveying direction, the nozzle row of the first head chip being formed as two or more nozzle rows;

the second head chip is arranged obliquely so that an extending direction of the nozzle row is inclined with respect to both of the conveying direction and the orthogonal direction, the nozzle row of the second head chip being formed as two or more nozzle rows;

the plurality of nozzles of the first head chip includes a first nozzle and a second nozzle, the first nozzle and the second nozzle being adjacent to each other in a same nozzle row of the two or more nozzle rows;

the plurality of nozzles of the second head chip includes a third nozzle and a fourth nozzle, the third nozzle and the fourth nozzle being adjacent to each other in a same nozzle row of the two or more nozzle rows; and the third nozzle is arranged between the first nozzle and the second nozzle in the orthogonal direction and the second nozzle is arranged between the third nozzle and the fourth nozzle in the orthogonal direction, or the first nozzle and the third nozzle are at a same position in the orthogonal direction and the second nozzle and the fourth nozzle are at a same position in the orthogonal direction.

According to a liquid discharging apparatus of a present disclosure, it is possible to realize a high resolution and an improved throughput, while suppressing increase in a size of a printer and suppressing lowering in an image quality.

DESCRIPTION

Figure 1:
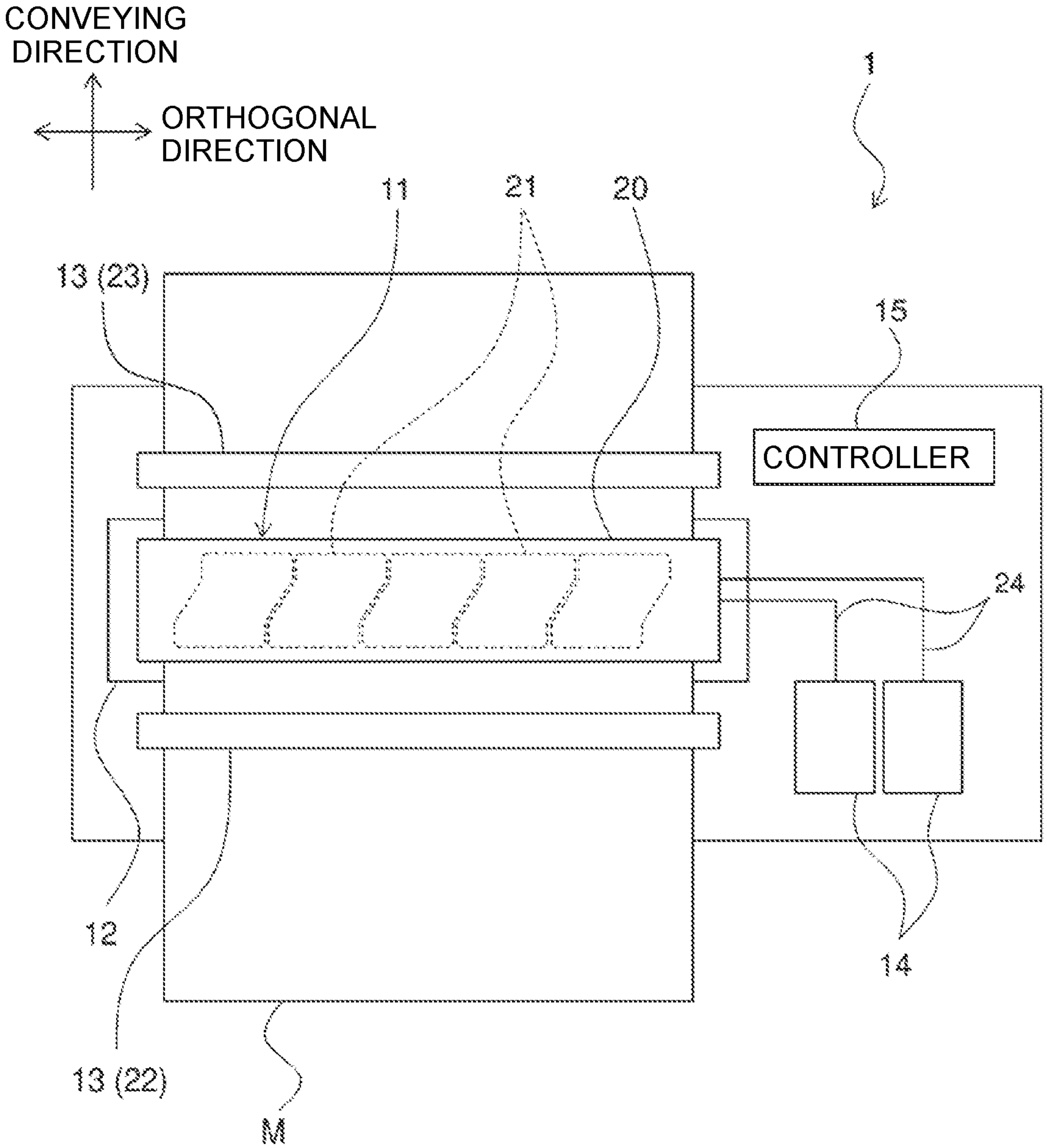
FIG. 1 is a plan view depicting a schematic configuration of a liquid discharging apparatus according to a present disclosure.

In the following, an embodiment of the present disclosure will be specifically described, with reference to the drawings. Note that in the following description, same reference numerals are used to same or corresponding elements throughout all the drawings, and any overlapping explanation therefor will be omitted. Further, the present disclosure is not limited to or restricted by the following embodiment, and any addition, deletion and/or change is/are possible within a range not departing from the spirit of the present disclosure.

(Configuration of Liquid Discharging Apparatus)

FIG. 1 is a plan view of a liquid discharging apparatus 1 according to the present disclosure. The liquid discharging apparatus 1 is an ink-jet printer which discharges (ejects) a liquid, for example, such as an ink, etc., from a head chip 10 so as to form (print) a letter, an image, etc., on a recording medium.

As depicted in FIG. 1, the liquid discharging apparatus 1 adopts a line head system, and is configured to discharge the ink, from a head unit 11 provided in a fixed manner, onto a recording medium M such as a paper, etc., which is being conveyed in a conveying direction. Such a liquid discharging apparatus 1 is provided with a platen 12, a conveyor 13, a tank 14 and a controller 15, in addition to the head unit 11. Note that the liquid discharging apparatus 1 may adopt a serial head system, rather than the line head system.

The head unit 11 has an array holder 20 of which size is long in an orthogonal direction orthogonal to the conveying direction; a plurality of chip arrays 21 is mounted on the array holder 20. The plurality of chip arrays 21 is arranged in the orthogonal direction and supported by the array holder 20; a plurality of head chips 10 (see FIG. 2) is provided on each of the plurality of chip arrays 21, as will be described later on.

The platen 12 is, for example, a plate member which is flat and rectangular, and is positioned to face the head unit 11. Further, the platen 12 has a size in the orthogonal direction longer than that of the head unit 11; an all-landing area of the ink discharged from the head unit 11 is positioned within an upper surface-area of the platen 12. The platen 12 supports the recording medium M, which is being conveyed along a predetermined conveying direction, on the upper surface of the platen 12. With this, a distance between the head unit 11 and the recording medium M is defined.

The conveyor 13 has two conveying roller pairs 22 and 23 and a conveying motor. The conveying roller pair 22 as one of the two conveying pairs is located on the upstream side in the conveying direction with respect to the platen 12, and is constructed of a driving roller and a driven roller forming a pair in an up-down direction. The driving roller is driven by the conveying motor, pinches the recording medium M between the driving roller and the driven roller, and conveys the recording medium M to the downstream side in the conveying direction, toward the upper surface of the platen 12. The conveying roller pair 23 as the other of the two conveying pairs is located on the downstream side in the conveying direction with respect to the platen 12, and is constructed of a driving roller and a driven roller forming a pair in the up-down direction. The driving roller is driven by the conveying motor, pinches the recording medium M between the driving roller and the driven roller, and conveys the recording medium M from the upper surface of the platen 12 to the downstream side in the conveying direction.

The tank 14 as many as the number corresponding to a kind of the ink is provided. In the present embodiment, the liquid discharging head 1 configured to discharge inks of two colors (two color inks) is exemplified. Accordingly, the liquid discharging apparatus 1 has a first tank 14 configured to store an ink of a first color and a second tank 14 configured to store an ink of a second color. Note that the color of the ink may be selected as appropriate. For example, a blue color may be selected as the first color, and a red color may be selected as the second color; alternatively, a black color may be selected as the first color, and a clear color may be selected as the second color. Each of the tanks 14 is connected to the head unit 11 via a supply tube 24, and the ink is fed from each of the tanks 14 to the head chips 10 via the supply tube 24.

The controller 15 controls the operation of a driving element of each parts of the liquid discharging apparatus 1. For example, in a case that the controller 15 receives an executing instruction of a print job from the outside, the controller 15 controls the conveyor 13 so as to convey the recording medium M onto the platen 12. In a case that the recording medium M reaches a predetermined position on the platen 12, the controller 15 controls the respective head chips 10 to discharge the inks from the respective head chips 10 based on image data in the print job, thereby forming an image on the recording medium M. The controller 15 controls the conveyor 13 to convey the recording medium M having the image formed thereon, and to discharge the recording medium M from the liquid discharging apparatus 1.

(Configuration of Chip Array)

Figure 2:
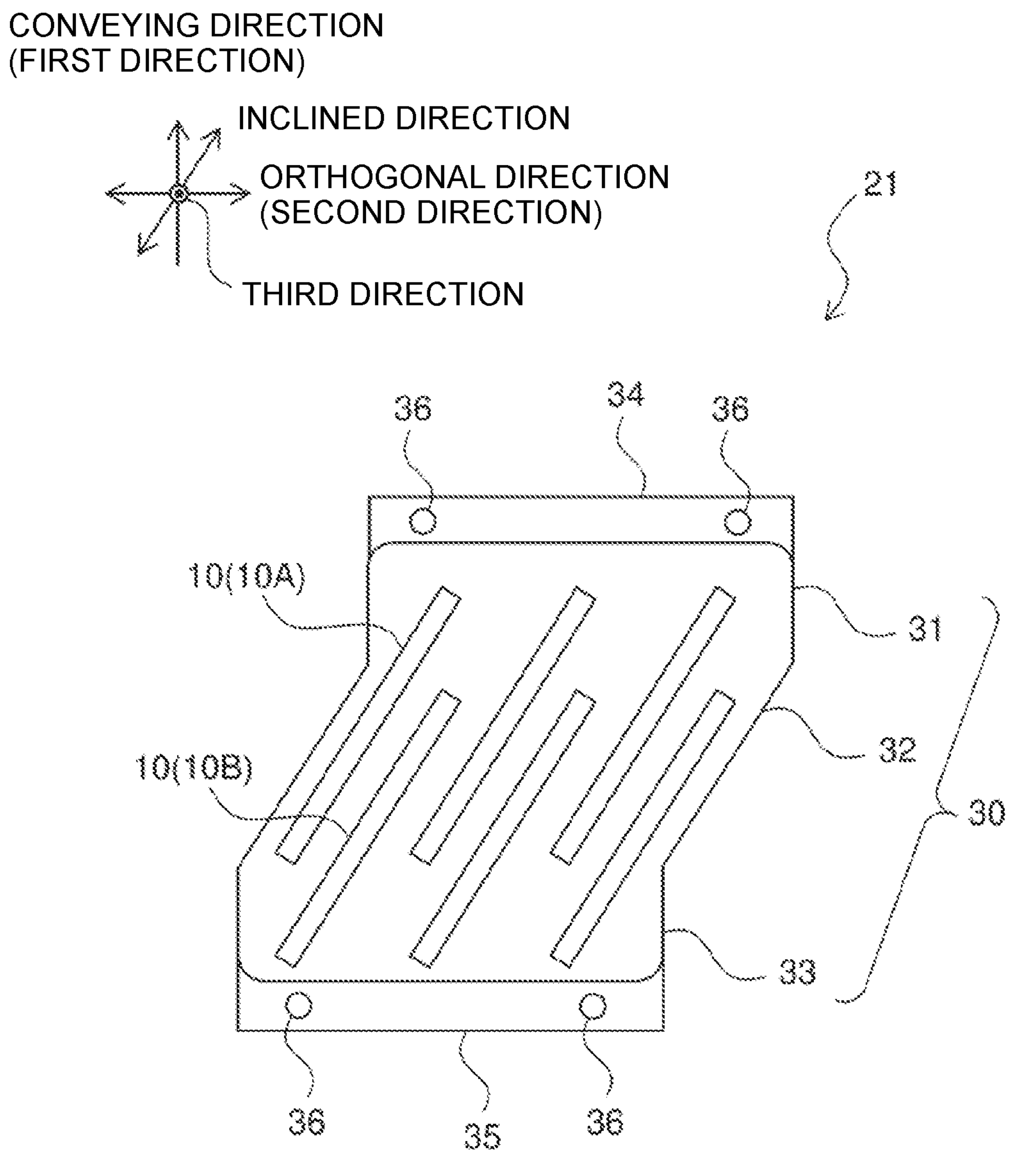
FIG. 2 is a plan view of a head chip array unit.

FIG. 2 is a plan view depicting the configuration of each of the plurality of chip arrays 21. In the following explanation, the above-described conveying direction is also referred to as a first direction, the orthogonal direction is also referred to as a second direction, and a direction orthogonal to both of the first and second directions is referred to as a third direction.

Each of the plurality of chip arrays 21 is provided with a casing 30, and a plurality of head chips 10 accommodated in the casing 30. As seen in the third direction, the casing 30 has a first end part 31 in the first direction, a second end part 33 in the first direction and an intermediate part 32 in the first direction which is located between the first end part 31 and the second end part 33. Each of the first end part 31 and the second end part 33 has a rectangular shape which is long in the second direction, and the first end part 31 and the second end part 33 are offset from each other in the second direction. Further, the intermediate part 32 has a shape of parallelogram, and connects the first end part 31 and the second end part 33. A flange 34 having a belt shape which is long in the second direction is provided on an edge part at one end of the first end part 31, and a flange 35 having a belt shape which is long in the second direction is provided on an edge part at the other end of the second end part 33. Through holes 36 are formed in these flanges 35 and 36, and the casing 30 is fixed to the array holder 20 by screws each of which is passed through one of the through holes 36.

The casing 30 has a predetermined thickness in the third direction, and has an internal space. A plurality of head chips 10 (six head chips 10 in the present embodiment) is accommodated in the internal space. Each of the head chips 10 has a long rectangular shape, and is arranged so that the longitudinal direction thereof extends along an inclined direction which is inclined with respect to both of the first and second directions. Namely, each of the head chips 10 is arranged obliquely so that the head chip 10 is inclined with respect to both of the first direction and the second direction. Further, the plurality of head chips 10 includes a first head chip 10A and a second head chip 10B which are arranged side by side in the first direction so as to make a pair. In the example of the chip array 21 depicted in FIG. 2, such a pair constructed of the first head chip 10A and the second head chip 10B are provided as three pairs arranged side by side in the second direction, and are accommodated in the casing 30.

(First Configuration Example of Head Chip)

Figure 3:
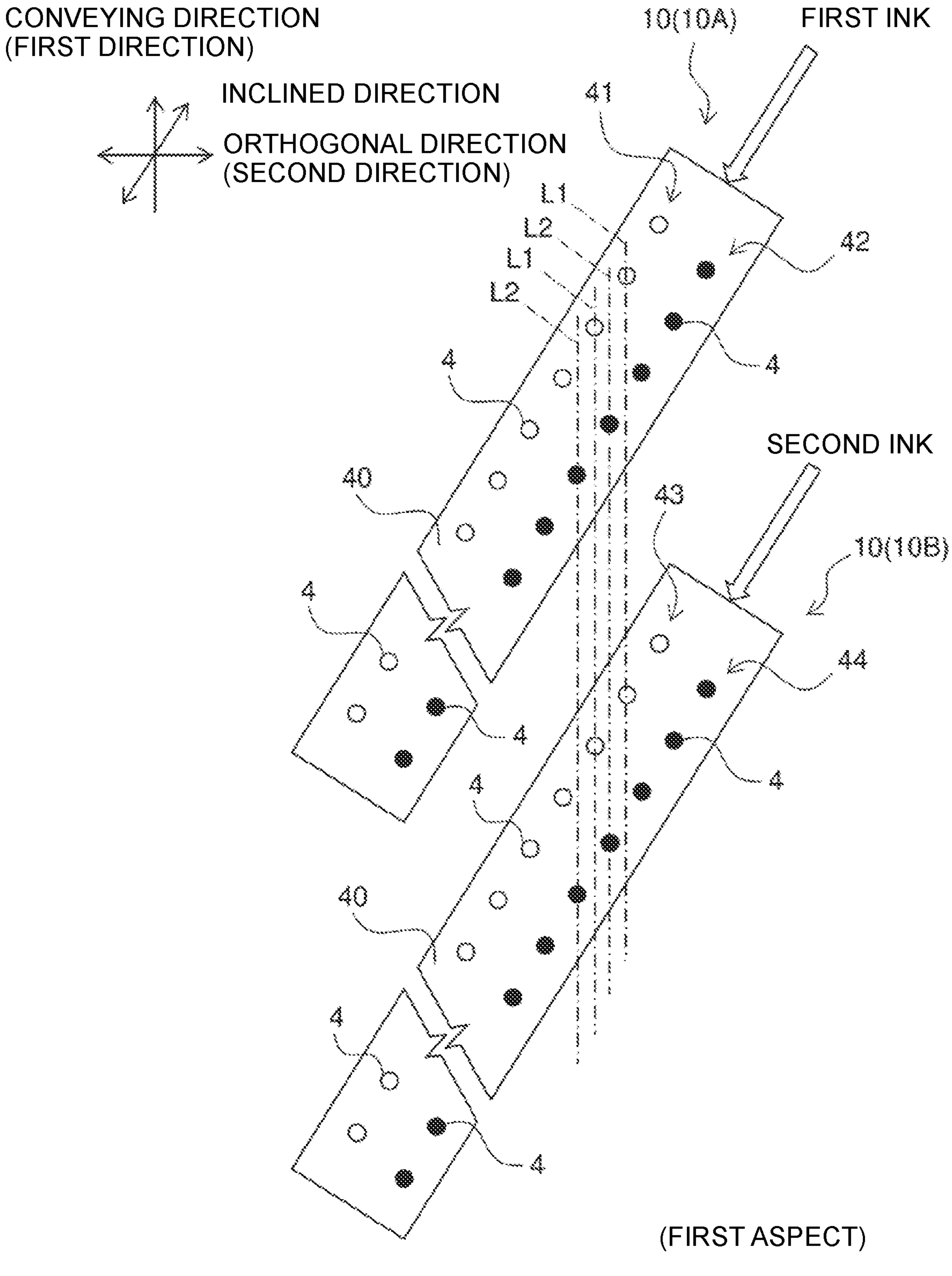
FIG. 3 is a schematic plan view depicting a first head chip and a second head chip.

FIG. 3 is a schematic view depicting a first configuration example of the first head chip 10A and the second head chip 10B which make a pair. The first head chip 10A has a nozzle surface 40 which has a flat and elongated rectangular shape, and a plurality of nozzles 4 configured to discharge the liquid onto the recording medium M is arranged so as to form two nozzle rows 41 and 42. In the first head chip 10A of FIG. 3, the nozzles 4 included in the nozzle row 41 are indicated by hollow circle marks, and the nozzles 4 included in the nozzle row 42 are indicated by solid circle marks. Further, these nozzle rows 41 and 42 are arranged obliquely so that each of the nozzle rows 41 and 42 extends along the inclined direction which is inclined with respect to both of the first direction and the second direction, like the head chip 10.

The second head chip 10B also has a nozzle surface 40 which has a flat and elongated rectangular shape, and a plurality of nozzles 4 configured to discharge the liquid onto the recording medium M is aligned so as to form two nozzle rows 43 and 44. In the second head chip 10B of FIG. 3, the nozzles 4 included in the nozzle row 43 are indicated by hollow circle marks, and the nozzles 4 included in the nozzle row 44 are indicated by solid circle marks. Further, these nozzle rows 43 and 44 are also arranged obliquely so that each of the nozzle rows 43 and 44 extends along the inclined direction which is inclined with respect to both of the first direction and the second direction, like the head chips 10.

In the example depicted in FIG. 3, the above-described four nozzle rows 41 to 44 are arranged, in this order, from one side to the other side of the first direction (from the downstream side to the upstream side of the conveying direction). Further, the longitudinal directions (the inclined direction) of the four nozzle rows 41 to 44 are parallel to one another; in the present embodiment, the longitudinal directions (the inclined direction) of the four nozzle rows 41 to 44 are inclined with respect to the second direction by an angle of 60 degrees. Note that three or more nozzle rows may be provided in one head chip 10.

Here, in the first head chip 10A, the nozzles 4 included in the nozzle row 41 and the nozzles 4 included in the nozzle row 42 are provided so that positions (for example, center positions) in the second direction (orthogonal direction) of the nozzles 4 in the nozzle row 41 and positions in the second direction of the nozzles 4 in the nozzle row 42 are shifted from one another, respectively, as seen in the first direction (conveying direction). Accordingly, a virtual line L1 passing through the center of any one nozzle 4 in the nozzle row 41 and extending in the first direction does not pass the center of any nozzle 4 in the nozzle row 42; a virtual line L2 passing through the center of any one nozzle 4 in the nozzle row 42 and extending in the first direction does not pass the center of any nozzle 4 in the nozzle row 41. Further, one virtual line L2 extends in a space between two adjacent virtual lines L1, L1, and one virtual line L1 extends in a space between two adjacent virtual lines L2, L2.

Similarly, also in the second head chip 10B, the nozzles 4 included in the nozzle row 43 and the nozzles 4 included in the nozzle row 44 are provided so that positions (for example, center positions) in the second direction (orthogonal direction) of the nozzles 4 in the nozzle row 43 and positions in the second direction of the nozzles 4 in the nozzle row 44 are shifted from one another, respectively, as seen in the first direction (conveying direction). Accordingly, a virtual line L1 passing through the center of any one nozzle 4 in the nozzle row 43 and extending in the first direction does not pass the center of any nozzle 4 in the nozzle row 44; a virtual line L2 passing through the center of any one nozzle 4 in the nozzle row 44 and extending in the first direction does not pass the center of any nozzle 4 in the nozzle row 43. Further, one virtual line L2 extends in a space between two adjacent virtual lines L1, L1, and one virtual line L1 extends in a space between two adjacent virtual lines L2, L2.

On the other hand, positions (for example, center positions) in the second direction (orthogonal direction) of the plurality of nozzles 4 possessed by the first head chip 10A and positions (for example, center positions) in the second direction (orthogonal direction) of the plurality of nozzles 4 possessed by the second head chip 10B are identical to each other, respectively, as seen in the first direction (conveying direction). Accordingly, as depicted in FIG. 3, a common (same) virtual line L1 passes the center of one nozzle 4 in the nozzle row 41 and the center of one nozzle 4 in the nozzle row 43. Further, a common (same) virtual line L2 passes the center of one nozzle 4 in the nozzle row 42 and the center of one nozzle 4 in the nozzle row 44.

Figure 8A:
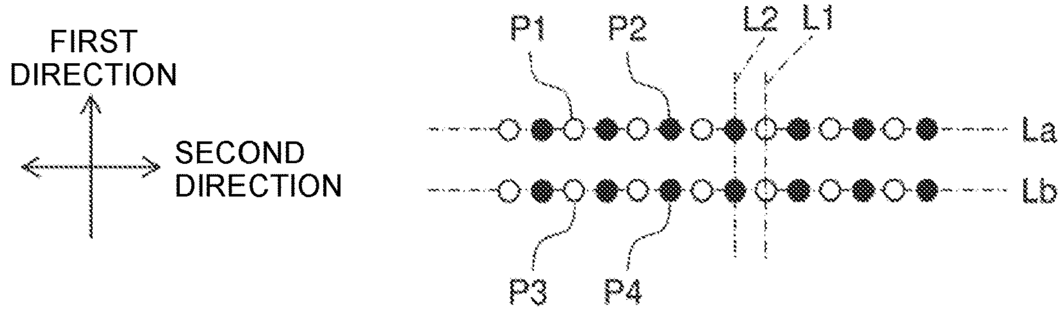
FIG. 8A to 8D are each a schematic view for explaining positions in a second direction of nozzles.

FIG. 8A is a schematic view for explaining the positions in the second direction of the plurality of nozzles 4 of the head chip 10 according to the first configuration example. FIG. 8A schematically depicts a state on a plane (projection surface) extending along the second direction in a case that a position of each of the plurality of nozzles 4 is projected in the first direction toward the plane.

To provide a specific explanation, each of virtual lines La and Lb represents a projection surface extending along the second direction. Further, a center position of each of the nozzles 4 of the first head chip 10A is indicated on the virtual line La, and a center position of each of the nozzles 4 of the second head chip 10B is indicated on the virtual line Lb. Further, a hollow circle mark on the virtual line La corresponds to a position P1 of each of the nozzles 4 included in the nozzle row 41, and a solid circle mark on the virtual line La corresponds to a position P2 of each of the nozzles 4 included in the nozzle row 42. A hollow circle mark on the virtual line Lb corresponds to a position P3 of each of the nozzles 4 included in the nozzle row 43, and a solid circle mark on the virtual line Lb corresponds to a position P4 of each of the nozzles 4 included in the nozzle row 44.

As depicted in FIG. 8A, the positions P1 (hollow circle marks) of the nozzles 4 of the nozzle row 41 and the positions P2 (solid circle marks) of the nozzles 4 of the nozzle row 42 of the first head chip 10A are arranged alternately one by one, without being overlapped with each other on the virtual line La. Further, the positions P3 (hollow circle marks) of the nozzles 4 of the nozzle row 43 and the positions P4 (solid circle marks) of the nozzles 4 of the nozzle row 44 of the second head chip 10B are arranged alternately one by one, without being overlapped with each other on the virtual line Lb. On the other hand, as seen in the first direction, positions in the second direction of the positions P1 on the virtual line La and positions in the second direction of the positions P3 on the virtual line Lb are coincident with each other, respectively (see the virtual line L1), and positions in the second direction of the positions P2 on the virtual line La and positions in the second direction of the positions P4 on the virtual line Lb are coincident with each other, respectively (see the virtual line L2).

Since such head chips 10 are arranged obliquely, it is possible to realize the high resolution in the second direction, while suppressing increase in the size. Further, since a resolution in the second direction is defined by the nozzles within a same head chip 10, nozzles 4 corresponding to dots adjacent to each other in the second direction on the printed image are positioned closely to each other in the first direction (conveying direction). Accordingly, it is possible to suppress lowering in the image quality due to, for example, conveyance error etc. Further, by arranging such head chips 10 side by side in the first direction, an improved throughput of the printing processing is also realized.

(Regarding Discharging Timing)

The liquid discharging apparatus 1 provided with the head chips 10 according to the first configuration example executes an intra-nozzle group discharge adjusting processing of controlling a timing (discharging timing), of discharging the liquid onto the recording medium M, based on a difference in the position in the first direction among the respective nozzles 4 of the inclined nozzle rows 41 to 44.

Figure 4:
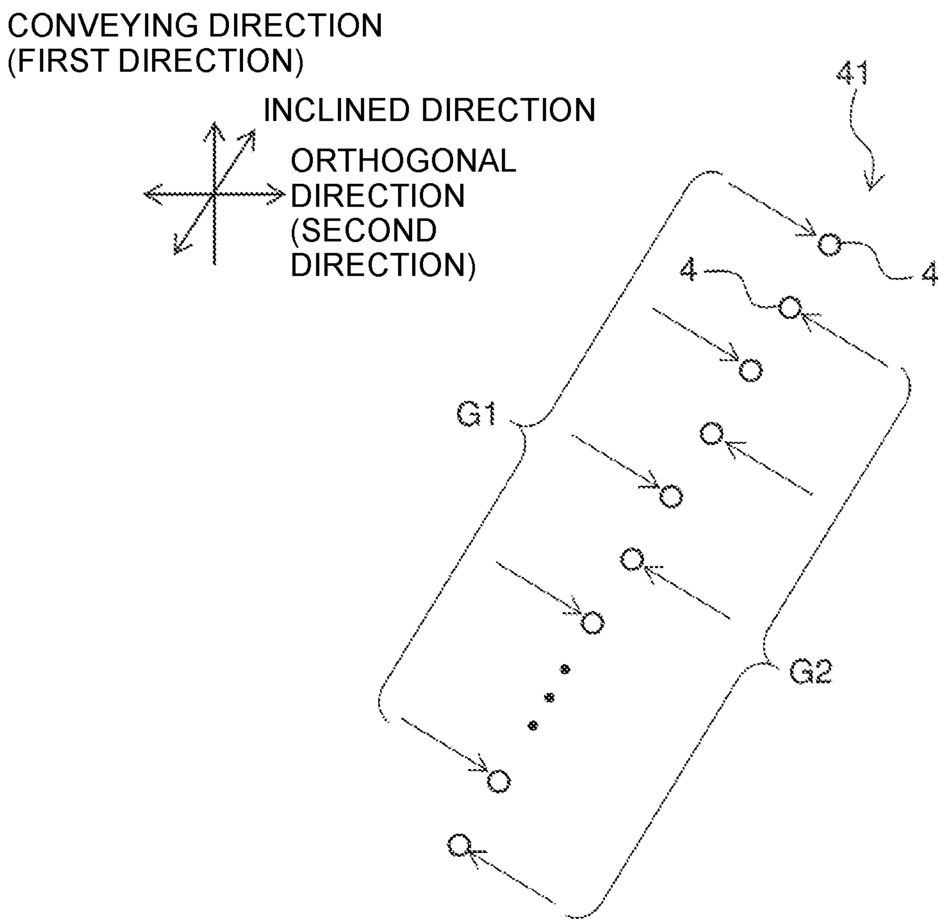
FIG. 4 is a schematic plan view depicting two nozzle groups possessed by a nozzle row.

Specifically, the plurality of nozzles 4 included in each of the nozzle rows 41 to 44 of the head chip 10 includes one nozzle group G1 to which every other (alternate) nozzles 4, of the plurality of nozzles 4, arranged along the extending direction of each of the nozzle rows 41 to 44 belong, and the other nozzle group G2 to which remaining nozzles 4, of the plurality of nozzles 4, different from the nozzles 4 belonging to the group G1 belong. FIG. 4 depicts the nozzle groups G1 and G2 with respect to the nozzle row 41, representing the nozzle rows 41 to 44. The controller 15 controls, as the intra-nozzle group discharge adjusting processing, the discharging timing of the liquid from the nozzles 4 within the nozzle group G1 based on the difference in the position in the conveying direction of the nozzles 4 with respect to the recording medium M. Similarly, the controller 15 controls the discharging timing of the liquid from the nozzles 4 within the nozzle group G2, based on the difference in the position in the conveying direction of the nozzles 4 with respect to the recording medium M.

For example, such a case is assumed that a first nozzle 4 within the nozzle group G1 and a second nozzle 4 within the nozzle group G1 and positioned downstream in the conveying direction of the first nozzle 4 are used to form two dots arranged side by side in the second direction at a predetermined position on the recording medium M. In this situation, a predetermined time is required from a timing at which the predetermined position on the recording medium M faces the first nozzle 4 until a timing at which the predetermined position on the recording medium M faces the second nozzle 4. Accordingly, in the case of forming the above-described two dots, the liquid is caused to be discharged from the first nozzle 4, and then the liquid is caused to be discharged from the second nozzle 4 with a delay of the predetermined time.

By such an intra-nozzle group discharge adjusting processing, it is possible to form a high quality image even though the nozzle rows 41 to 44 are arranged obliquely in the head chip 10.

On the other hand, the liquid discharging apparatus 1 executes also an inter-nozzle groups discharge adjusting processing which is different from the above-described intra-nozzle group discharge adjusting processing. Specifically, this inter-nozzle groups discharge adjusting processing is a processing of making a discharging timing of the liquid from the nozzle group G1 as one nozzle group and a discharging timing of the liquid from the nozzle group G2 as the other nozzle group different from each other, in each of the nozzle rows 41 to 44.

By such an inter-nozzle groups discharge adjusting processing, it is possible to increase a distance between the nozzles 4 which are caused to discharge the liquid at a same time. With this, a distance between the liquids which are discharged at a same time is made great. Accordingly, it is possible to suppress an influence by an airflow generated by the discharged liquid (self airflow) acting on other discharged liquid, thereby making it possible to suppress any generation of a deviation in a flying direction of the liquid.

(Aspect of Supplying Liquid)

In a case that two kinds of the liquid are discharged in the above-described liquid discharging apparatus 1, a kind of the liquid to be supplied to each of the first head chip 10A and the second head chip 10B which make the pair may be different from each other. For example, as depicted in FIG. 3, a first ink is supplied to all the nozzle rows 41 and 42 possessed by the first head chip 10A, and a second ink is supplied to all the nozzle rows 43 and 44 possessed by the second head chip 10B.

In this case, since the liquid can be supplied to one head chip 10 by one supply line, it is possible to prevent the configuration of a liquid route connecting the tank 14 and the head chip 10 from being complicated, and to simplify the configuration. Further, accompanying with the simplified configuration, it is also possible to realize a small-sized apparatus and a lowered pressure loss in the liquid channel.

(Second Configuration Example of Head Chip)

Figure 5:
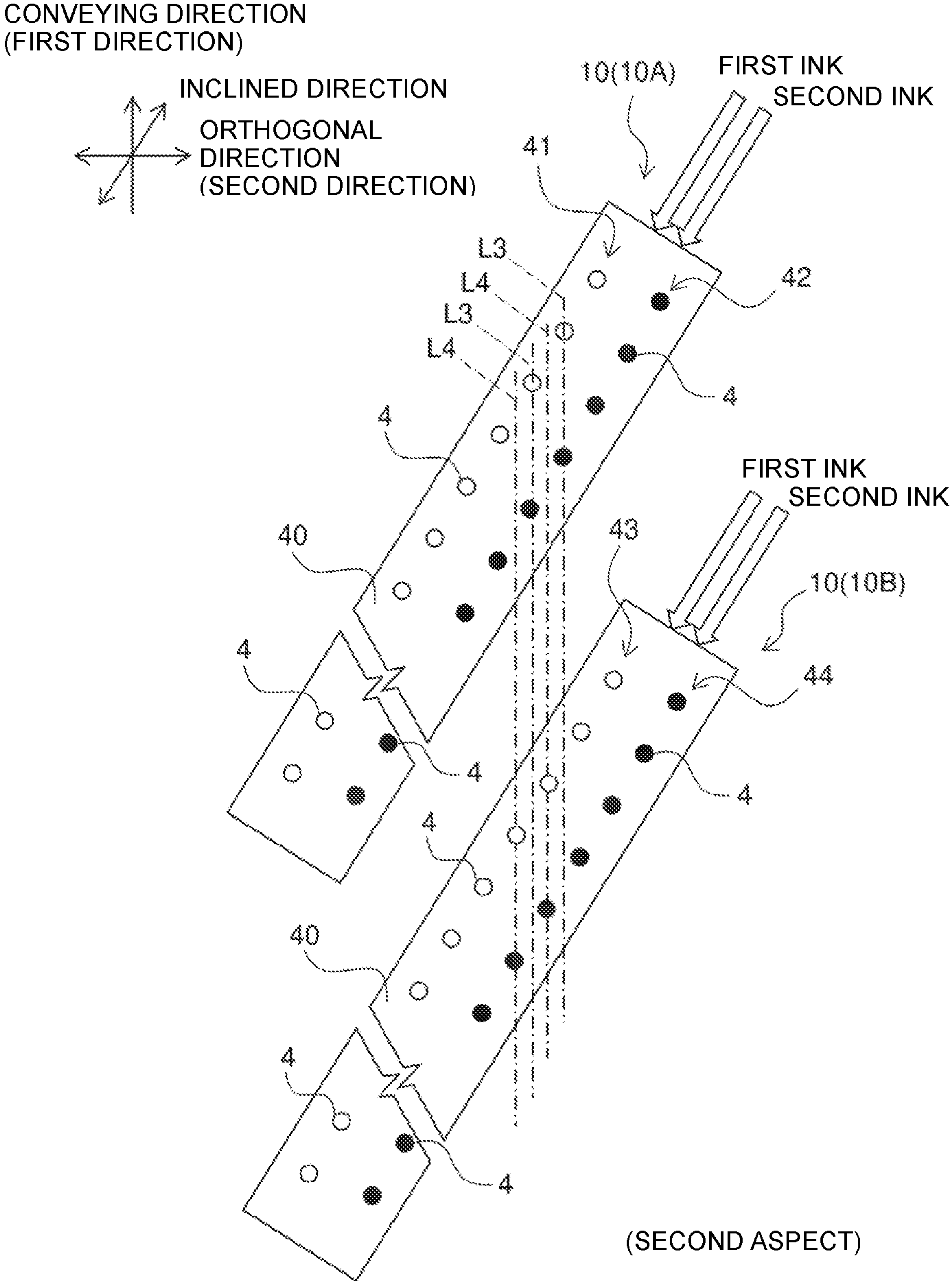
FIG. 5 is a schematic plan view depicting a first head chip and a second head chip.

FIG. 5 is a schematic view depicting a second configuration example of a first head chip 10A and a second head chip 10B which make a pair. This head chip 10 has a positional relationship of the nozzles 4 which is different from that of the head chip 10 according to the first configuration example as depicted in FIG. 3. A specific explanation will be given in the following.

In the first head chip 10A, the nozzles 4 included in the nozzle row 41 and the nozzles 4 included in the nozzle row 42 are provided so that positions (for example, the center positions) in the second direction (orthogonal direction) of the nozzles 4 in the nozzle row 41 and positions in the second direction of the nozzles 4 in the nozzle row 42 are coincident with one another, respectively, as seen in the first direction (conveying direction). Accordingly, a virtual line L3 passing through the center of any one nozzle 4 in the nozzle row 41 and extending in the first direction passes the center of a nozzle 4 in the nozzle row 42.

Similarly, also in the second chip 10B, the nozzles 4 included in the nozzle row 43 and the nozzles 4 included in the nozzle row 44 are provided so that positions (for example, the center positions) in the second direction (orthogonal direction) of the nozzles 4 in the nozzle row 43 and positions in the second direction of the nozzles 4 in the nozzle row 44 are coincident with one another, respectively, as seen in the first direction (conveying direction). Accordingly, a virtual line L4 passing through the center of any one nozzle 4 in the nozzle row 43 and extending in the first direction passes the center of a nozzle 4 in the nozzle row 44.

On the other hand, the plurality of nozzles 4 possessed by the first head chip 10A and the plurality of nozzles 4 possessed by the second head chip 10B are provided so that positions (for example, the center positions) in the second direction (orthogonal direction) of the nozzles 4 in the first head chip 10A and positions in the second direction of the nozzles 4 in the second head chip 10B are shifted from one another, respectively, as seen in the first direction (conveying direction). Accordingly, as depicted in FIG. 5, a virtual line L3 passing the center of any one nozzle 4 in the nozzle row 41 and the center of a nozzle 4 in the nozzle row 42 does not pass the center of any nozzle 4 in the nozzle row 43 and the center of any nozzle 4 in the nozzle row 44; and a virtual line L4 passing the center of any one nozzle 4 in the nozzle row 43 and the center of a nozzle 4 in the nozzle row 44 does not pass the center of any nozzle 4 in the nozzle row 41 and the center of any nozzle 4 in the nozzle row 42.

Figure 8B:
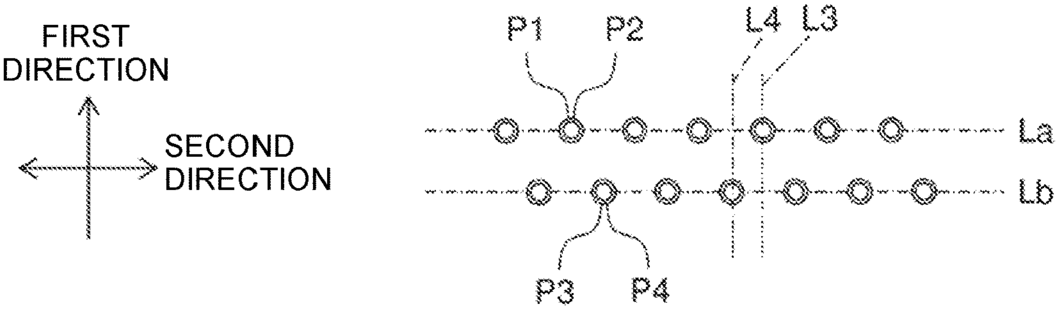

In a schematic view of FIG. 8B, a double circle mark indicates a position at which a position P1 to which the nozzles 4 of the nozzle row 41 is projected and a position P2 to which the nozzle 4 of the nozzle row 42 is projected overlap with each other. Similarly, a double circle mark indicates a position at which a position P3 to which the nozzles 4 of the nozzle row 43 is projected and a position P4 to which the nozzle 4 of the nozzle row 44 is projected overlap with each other.

As depicted in FIG. 8B, the position P1 of the nozzle 4 of the nozzle row 41 and the position P2 of the nozzle 4 of the nozzle row 42 of the first head chip 10A are present while overlapping with each other on a virtual line La. Further, the position P3 of the nozzle 4 of the nozzle row 43 and the position P4 of the nozzle 4 of the nozzle row 44 of the second head chip 10B are present while overlapping with each other on a virtual line Lb. On the other hand, in a case that the positions P1, P2, P3 and P4 are seen in the first direction, an overlapping position at which the positions P1 and P2 overlap with each other on the virtual line La and an overlapping position at which the positions P3 and P4 overlap with each other on the virtual line Lb are shifted from each other in view of the positions thereof in the second direction (see the virtual lines L3 and L4).

Since such the head chips 10 are arranged obliquely, it is possible to realize the high resolution in the second direction, while suppressing increase in the size. Further, since a resolution in the second direction is defined by the nozzles of the head chips 10A and 10B within a same chip array 21, nozzles 4 corresponding to dots adjacent to each other in the second direction on the printed image are positioned closely to each other in the first direction (conveying direction). Accordingly, it is possible to suppress lowering in the image quality due to, for example, any error in the conveyance. Further, since the nozzles 4 in the same head chip 10 are arranged at a same position in the second direction, an improved throughput is also realized in the printing processing.

Note that also in the liquid discharging head 1 provided with the head chips 10 according to the second configuration example, the controller 15 executes the intra-nozzle group discharge adjusting processing and the inter-nozzle groups discharge adjusting processing, in a similar manner as that explained with respect to the first configuration example. Since the details of the respective processing are same as those as explained in the foregoing, any explanation therefor will be omitted.

In a case that the liquid discharging apparatus 1 is configured to discharge two kinds of the liquid, it is acceptable to make a kind of the liquid different between the nozzle row 41 and the nozzle row 42 possessed by the first head chip 10A, and to make a kind of the liquid different between the nozzle row 43 and the nozzle row 44 possessed by the second head chip 10B. For example, the first ink is supplied to the nozzle row 41 and the second ink is supplied to the nozzle row 42. Similarly, the first ink is supplied to the nozzle row 43 and the second ink is supplied to the nozzle row 44.

In this case, in a situation that a same kind of ink is discharged onto the recording medium M, the ink can be discharged from the nozzles 4 which are separated from each other in each of the first head chip 10A and the second head chip 10B. Accordingly, it is possible to suppress any occurrence of the deviation in the flying direction of the liquid due to the self airflow.

(Third Configuration Example of Head Chip)

Figure 6:
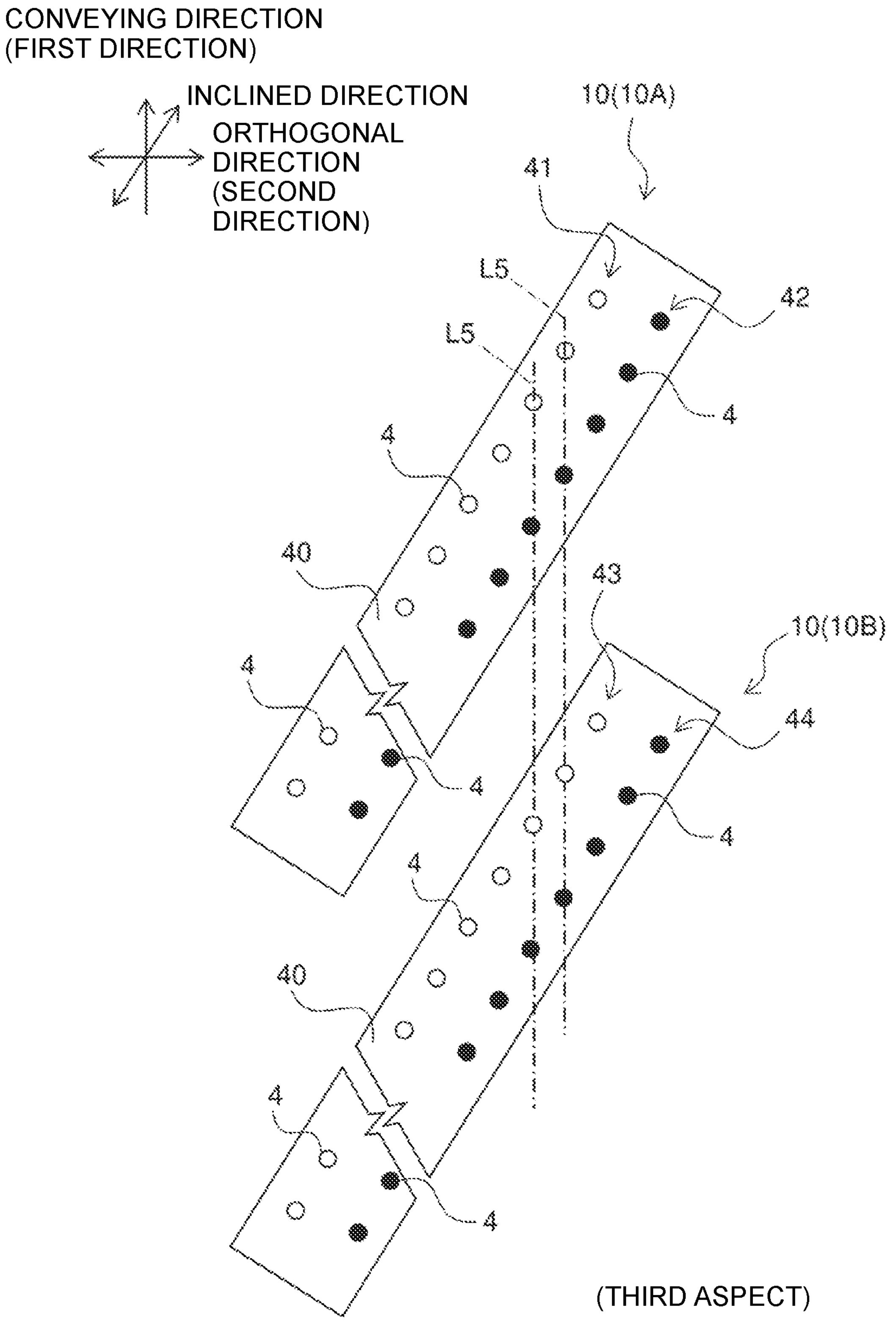
FIG. 6 is a schematic plan view depicting a first head chip and a second head chip.

FIG. 6 is a schematic view depicting a third configuration example of a first head chip 10A and a second head chip 10B which make a pair. This head chip 10 has a positional relationship of the nozzles 4 which is different from that of the head chip 10 according to each of the first example and the second example explained above. A specific explanation will be given in the following.

In the first head chip 10A, the nozzles 4 included in the nozzle row 41 and the nozzles 4 included in the nozzle row 42 are provided so that positions (for example, the center positions) in the second direction (orthogonal direction) of nozzles 4 in the nozzle row 41 and positions in the second direction of the nozzles 4 in the nozzle row 42 are coincident with one another, respectively, as seen in the first direction (conveying direction). Accordingly, a virtual line L5 passing through the center of any one nozzle 4 in the nozzle row 41 and extending in the first direction passes the center of a nozzle 4 in the nozzle row 42.

Similarly, also in the second chip 10B, the nozzles 4 included in the nozzle row 43 and the nozzles 4 included in the nozzle row 44 are provided so that positions (for example, the center positions) in the second direction (orthogonal direction) of the nozzles 4 in the nozzle row 43 and positions in the second direction of the nozzles 4 in the nozzle row 44 are coincident with one another, respectively, as seen in the first direction (conveying direction). Accordingly, a virtual line L5 passing through the center of any one nozzle 4 in the nozzle row 43 and extending in the first direction passes the center of a nozzle 4 in the nozzle row 44.

Further, the plurality of nozzles 4 possessed by the first head chip 10A and the plurality of nozzles 4 possessed by the second head chip 10B are provided so that positions (for example, the center positions) in the second direction (orthogonal direction) of the nozzles of the first head chip 10A and positions in the second direction of the nozzles 4 of the second head chip 10 B are coincident with one another, respectively, as seen in the first direction (conveying direction). Accordingly, as depicted in FIG. 6, the virtual line L5 passes the center of a nozzle 4 in the nozzle row 41 and the center of a nozzle 4 in the nozzle row 42 and also passes the center of a nozzle 4 in the nozzle row 43 and the center of a nozzle 4 in the nozzle row 44.

Figure 8C:
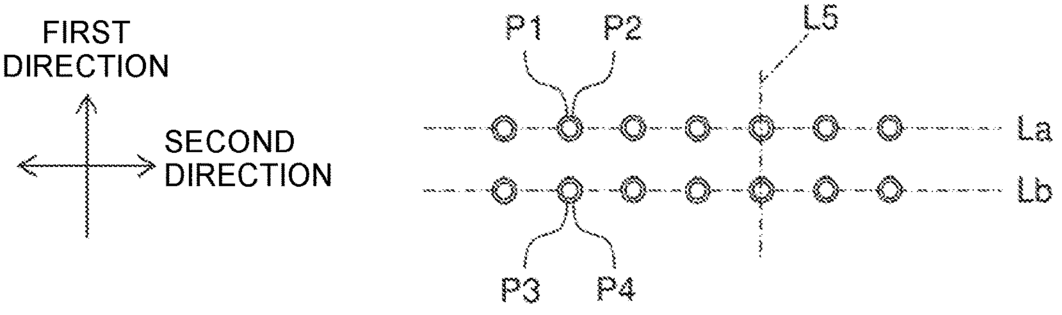

As depicted in a schematic view of FIG. 8C, a position P1 of the nozzle 4 of the nozzle row 41 and a position P2 of the nozzle 4 of the nozzle row 42 of the first head chip 10A are present while overlapping with each other on a virtual line La. Further, a position P3 of the nozzle 4 of the nozzle row 43 and a position P4 of the nozzle 4 of the nozzle row 44 of the second head chip 10B are present while overlapping with each other on a virtual line Lb. Further, in a case that the positions P1, P2, P3 and P4 are seen in the first direction, an overlapping position at which the positions P1 and P2 overlap with each other on the virtual line La and an overlapping position at which the positions P3 and P4 overlap with each other on the virtual line Lb are coincident with each other in view of the positions thereof in the second direction (see the virtual line L5).

Since such the head chips 10 are arranged obliquely, it is possible to realize the high resolution in the second direction, while suppressing any increase in the size. Further, since nozzles 4 corresponding to dots adjacent to each other in the second direction on the printed image are positioned closely to each other in the first direction (conveying direction), it is possible to suppress any lowering in the image quality due to, for example, any error in the conveyance. Furthermore, by arranging such head chips 10 side by side in the first direction, an improved throughput is also realized in the printing processing. In addition to this, since the nozzles 4 of which positions in the second direction are same are present in a large number, it is possible to improve a coverage by the ink on the recording medium M while attempting an improved throughput. As a result, it is possible to lower influence by a base color of the recording medium M, thereby making it possible to provide a printed image with a high reproducibility with respect to image data.

(Fourth Configuration Example of Head Chip)

Figure 7:
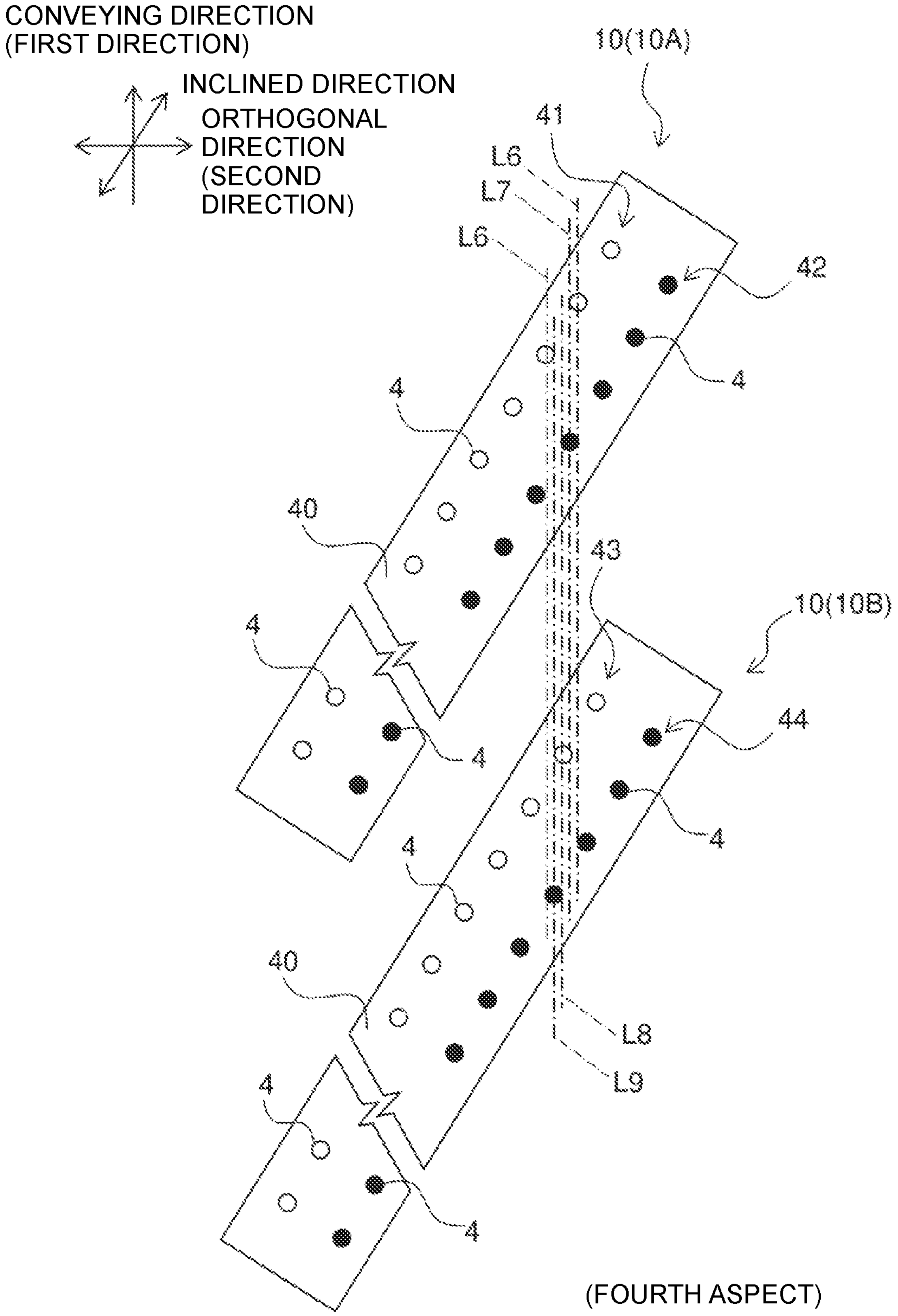
FIG. 7 is a schematic plan view depicting a first head chip and a second head chip.

FIG. 7 is a schematic view depicting a fourth configuration example of a first head chip 10A and a second head chip 10B which make a pair. This head chip 10 has a positional relationship of the nozzles 4 which is different from that of the head chip 10 according to each of the first to third configuration examples as explained above. A specific explanation will be given in the following.

In the first head chip 10A, nozzles 4 included in a nozzle row 41 and nozzles 4 included a nozzle row 42 are provided so that positions (for example, center positions) in the second direction (orthogonal direction) of nozzles 4 in the nozzle row 41 and positions in the second direction of the nozzles 4 in the nozzle row 42 are shifted from one another, respectively, as seen in the first direction (conveying direction). Accordingly, a virtual line L6 passing through the center of any one nozzle 4 in the nozzle row 41 and extending in the first direction is not coincident with a virtual line L7 passing through the center of any one nozzle 4 in the nozzle row 42 and extending in the first direction, and the virtual line L6 and the virtual line L7 are shifted from each other in the second direction.

Similarly, in the second head chip 10B, nozzles 4 included in a nozzle row 43 and nozzles 4 included a nozzle row 44 are provided so that positions (for example, center positions) in the second direction (orthogonal direction) of the nozzles 4 in the nozzle row 43 and positions in the second direction of the nozzles 4 in the nozzle row 44 are shifted from one another, respectively, as seen in the first direction (conveying direction). Accordingly, a virtual line L8 passing through the center of any one nozzle 4 in the nozzle row 43 and extending in the first direction is not coincident with a virtual line L9 passing through the center of any one nozzle 4 in the nozzle row 44 and extending in the first direction, and the virtual line L8 and the virtual line L9 are shifted from each other in the second direction.

Further, the nozzles 4 possessed by the first head chip 10A and the nozzles 4 possessed by the second head chip 10B are provided so that positions (for example, the center positions) in the second direction (orthogonal direction) of the nozzles 4 of the first head chip 10A and positions in the second direction of the nozzles 4 of the second head chip 10B are shifted from one another, respectively, as seen in the first direction (conveying direction). Accordingly, as depicted in FIG. 7, the above-described virtual lines L6 to L9 do not coincident with one another, and are shifted from one another in the second direction.

Figure 8D:
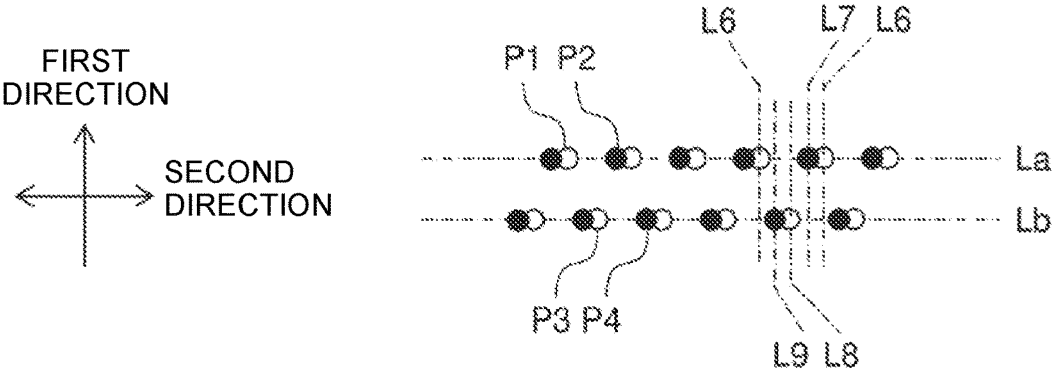

As depicted in a schematic view of FIG. 8D, a position P1 of the nozzle 4 of the nozzle row 41 and a position P2 of the nozzle 4 of the nozzle row 42 of the first head chip 10A are present while shifting from each other in the second direction on a virtual line La (see the virtual lines L6 and L7). Further, a position P3 of the nozzle 4 of the nozzle row 43 and a position P4 of the nozzle 4 of the nozzle row 44 of the second head chip 10B are present while shifting from each other in the second direction on a virtual line Lb (see the virtual lines L8 and L9). Further, in a case that the positions P1, P2, P3 and P4 are seen in the first direction, the positions P1 and P2 on the virtual line La and the positions P3 and P4 on the virtual line Lb do not coincide with one another, in view of the positions thereof in the second direction, and the positions P1, P2, P3 and P4 are shifted from one another.

Note that in the example depicted in FIG. 7, an order of the arrangement in the second direction of the respective nozzles 4 is, from one side to the other side in the second direction, a nozzle 4 of the nozzle row 41 (see the virtual line L6), a nozzle 4 of the nozzle row 42 (see the virtual line L7), a nozzle 4 of the nozzle row 43 (see the virtual line L8) and a nozzle 4 of the nozzle row 44 (see the virtual line L9).

Since such the head chips 10 are arranged obliquely, it is possible to realize the high resolution in the second direction, while suppressing increase in the size. In particular, since any nozzles 4 of the nozzle rows 41 to 44 are shifted from each other without the positions thereof in the second direction being coincident with one another, it is possible to print an image with a particularly high resolution. Further, since nozzles 4 corresponding to dots adjacent to each other in the second direction on the printed image are positioned closely to each other in the first direction (conveying direction), it is possible to suppress lowering in the image quality due to, for example, any error in the conveyance.

The present disclosure is applicable to a liquid discharging apparatus provided with a plurality of head chips each of which is configured to discharge a liquid, such as an ink, toward a recording medium.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The nozzles 4 in the first head chip 10A and the nozzles 4 in the second head chip 10B may be arranged in any manner. The plurality of nozzles 4 of the first head chip 10A may include a first nozzle and a second nozzle, the first nozzle and the second nozzle being adjacent to each other in a same nozzle row; the plurality of nozzles 4 of the second head chip 10B may include a third nozzle and a fourth nozzle, the third nozzle and the fourth nozzle being adjacent to each other in a same nozzle row. The third nozzle may be arranged between the first nozzle and the second nozzle in the orthogonal direction and the second nozzle may be arranged between the third nozzle and the fourth nozzle in the orthogonal direction, or the first nozzle and the third nozzle may be at a same position in the orthogonal direction and the second nozzle and the fourth nozzle may be at a same position in the orthogonal direction.

What is claimed is:

1. A liquid discharging apparatus comprising:

a first head chip having a nozzle surface in which a nozzle row is formed, a plurality of nozzles configured to discharge a liquid toward a recording medium being arranged in the nozzle row; and a second head chip having a nozzle surface in which a nozzle row is formed, a plurality of nozzles configured to discharge a liquid toward the recording medium being arranged in the nozzle row, wherein:

the first head chip is arranged obliquely so that an extending direction of the nozzle row is inclined with respect to both of a conveying direction of the recording medium and an orthogonal direction orthogonal to the conveying direction, the nozzle row of the first head chip being formed as two or more nozzle rows;

the second head chip is arranged obliquely so that an extending direction of the nozzle row is inclined with respect to both of the conveying direction and the orthogonal direction, the nozzle row of the second head chip being formed as two or more nozzle rows;

the plurality of nozzles of the first head chip includes a first nozzle and a second nozzle, the first nozzle and the second nozzle being adjacent to each other in a same nozzle row of the two or more nozzle rows;

the plurality of nozzles of the second head chip includes a third nozzle and a fourth nozzle, the third nozzle and the fourth nozzle being adjacent to each other in a same nozzle row of the two or more nozzle rows;

the third nozzle is arranged between the first nozzle and the second nozzle in the orthogonal direction and the second nozzle is arranged between the third nozzle and the fourth nozzle in the orthogonal direction, or the first nozzle and the third nozzle are at a same position in the orthogonal direction and the second nozzle and the fourth nozzle are at a same position in the orthogonal direction;

in the first head chip, positions in the orthogonal direction of nozzles, of the plurality of nozzles, belonging to one nozzle row of the two or more nozzle rows and positions in the orthogonal direction of nozzles, of the plurality of nozzles, belonging to another nozzle row of the two or more nozzle rows are shifted from each other, respectively;

in the second head chip, positions in the orthogonal direction of nozzles, of the plurality of nozzles, belonging to one nozzle row of the two or more nozzle rows and positions in the orthogonal direction of nozzles, of the plurality of nozzles, belonging to another nozzle row of the two or more nozzle rows are shifted from each other, respectively; and positions in the orthogonal direction of the plurality of nozzles of the first head chip and positions in the orthogonal direction of the plurality of nozzles of the second head chip are coincident with each other, respectively.

2. The liquid discharging apparatus according to claim 1, further comprising a controller, wherein:

the plurality of nozzles of the first head chip includes, regarding at least one of the two or more nozzle rows, a first nozzle group to which every other nozzles of the nozzles arranged in the extending direction of the nozzle row belong, and a second nozzle group to which remaining nozzles belong;

the plurality of nozzles of the second head chip includes, regarding at least one of the two or more nozzle rows, a first nozzle group to which every other nozzles of the nozzles arranged in the extending direction of the nozzle row belong, and a second nozzle group to which remaining nozzles belong; and the controller is configured to execute, regarding each of the first head chip and the second head chip, an inter-nozzle groups discharge adjusting processing of making a discharging timing of the liquid from the first nozzle group and a discharging timing of the liquid from the second nozzle group different from each other.

3. The liquid discharging apparatus according to claim 2, wherein the controller is configured to execute, regarding at least one of the first head chip and the second head chip, an intra-nozzle group discharge adjusting processing of controlling a discharging timing of the liquid from nozzles within a same nozzle group of the first nozzle group and the second nozzle group, based on a difference in a position in the conveying direction of the nozzles with respect to the recording medium.

4. The liquid discharging apparatus according to claim 1, wherein:

a liquid of a same kind is supplied to all of the two or more nozzle rows of the first head chip;

a liquid of a same kind is supplied to all of the two or more nozzle rows of the second head chip; and a kind of the liquid supplied to the first head chip and a kind of the liquid supplied to the second head chip are different from each other.

* * * * *